Jan. 5, 1971    M. G. KAUFMAN ET AL    3,553,697
CHANNEL COMBINER SYSTEM FOR SEQUENTIALLY
RECEIVED PHASE SIGNALS
Filed April 30, 1968    3 Sheets-Sheet 1

INVENTORS
**MAXIME G. KAUFMAN
KENNETH E. JACOBS**

BY

ATTORNEY

Jan. 5, 1971 M. G. KAUFMAN ET AL 3,553,697
CHANNEL COMBINER SYSTEM FOR SEQUENTIALLY
RECEIVED PHASE SIGNALS
Filed April 30, 1968 3 Sheets-Sheet 2

INVENTORS
MAXIME G. KAUFMAN
KENNETH E. JACOBS

BY
ATTORNEY

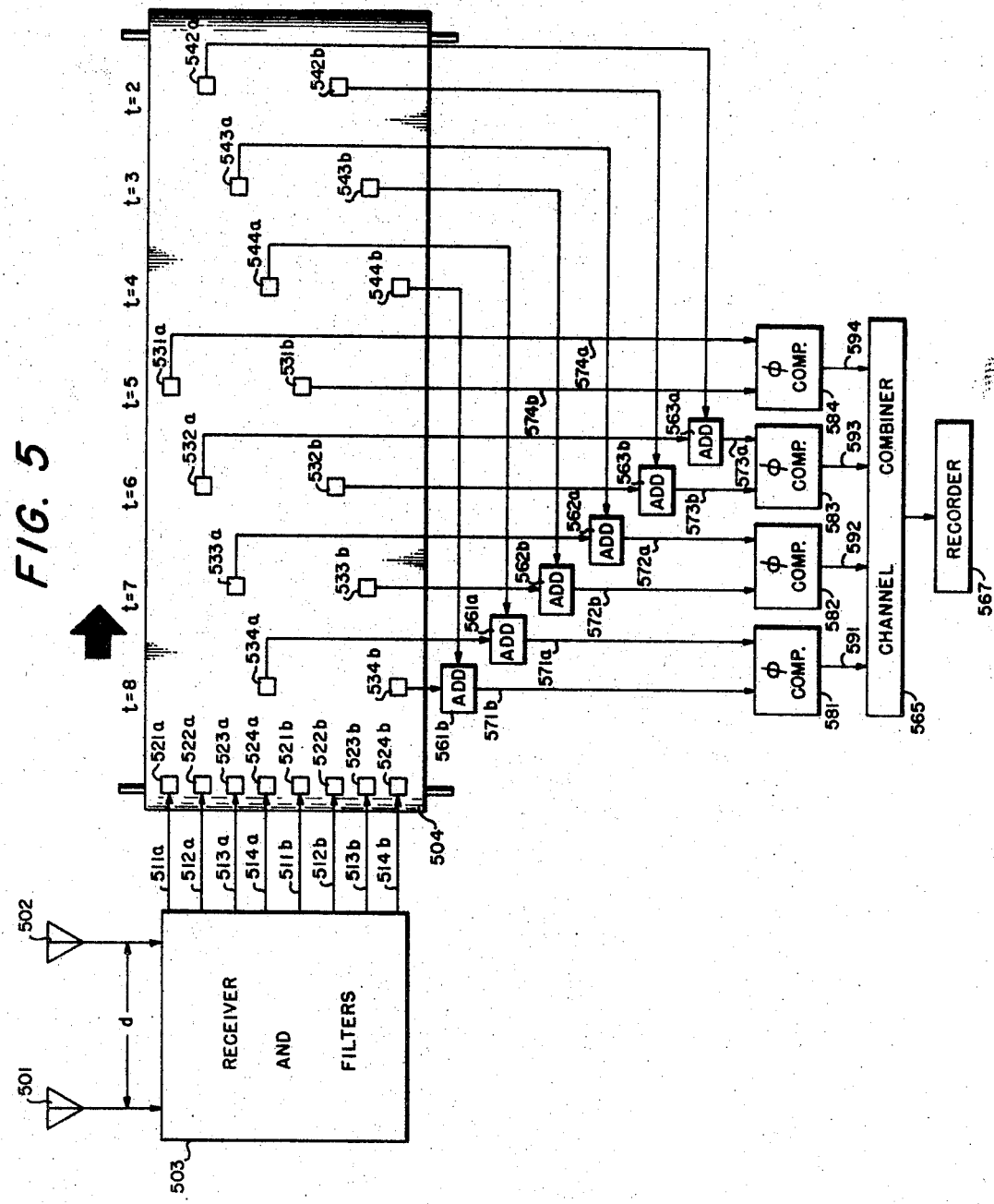

3,553,697
CHANNEL COMBINER SYSTEM FOR SEQUEN-
TIALLY RECEIVED PHASE SIGNALS
Maxime G. Kaufman, Huntingtown, Md., and Kenneth
E. Jacobs, Washington, D.C., assignors to the United
States of America as represented by the Secretary of
the Navy
Filed Apr. 30, 1968, Ser. No. 725,476
Int. Cl. G01s 5/02; G11b 5/00
U.S. Cl. 343—113        7 Claims

ABSTRACT OF THE DISCLOSURE

A radio interferometer system for detecting and combining phase differences of sequential signals arriving from a moving target. The signals of various frequencies are received by a pair of spaced antennas and temporarily stored. Phase errors in these signals, due to the changing location of the target, are compensated for by weightedly adding plural A.C. signals received at different times to obtain resultant signals whose phases correspond to that of signals starting simultaneously from the target.

The invention described herein may be manufactured and used by or for the Government of the United States of America for governmental purposes without the payment of any royalties thereon or therefor.

BACKGROUND OF THE INVENTION

The present invention relates to radio interferometer measurements and more particularly to interferometer measurements being made with sequentially received signals.

In the field of satellite tracking it has been the general practice to employ interferometer techniques to determine the angle of arrival of signals from satellites or other objects in space. Such satellites and objects normally move at high angular rates relative to the surface of the earth and continuous time and angle sensitivity are required to insure complete sensing. The interferometer technique determines the direction of the incidence by measuring the difference in phase of the incident energy at separated points. An inherent difficulty presents itself however, because phase measuring devices produce a measurement which is ambiguous as to the number of full wavelengths included in the measured difference. Without some way of keeping track of the number of cycles involved, a phase meter will give the same indication for $x$ degrees as it does for $(360n+x)$ degrees, where $n$ is zero or any integer. The correct direction angle may be determined by employing a system of pairs of antennas starting with a pair separated by less than ½ wavelength to provide a phase change of less than 360° on this short baseline. In any practical system there is a limit to the accuracy with which the phase can be measured and the resulting error is inversely proportional to the length of the baseline. In order to take advantage of the resolution improvement obtained by long baselines while circumventing the problem of ambiquity, many pairs of antennas have been used, spaced so that signals from each successive pair can be correctly deduced from the signal of the previous pair. Such a system is described in U.S. Pat. No. 3,122,741 issued to Roger L. Easton on Feb. 25, 1964.

Instead of using plural pairs of differently spaced antennas, a similar result may be obtained by using a single antenna pair along with plural frequencies. The frequencies are chosen so that the antenna baseline corresponds to ½ wavelength of the lowest frequency while the higher frequencies progressively increase the resolution of the system. Such a system decreases the number of antennas required, but the plural frequencies require a greater amount of power than the single frequency systems. If the system is used to track small passive satellites which present a minimum reflecting surface, a large amount of power must be expended in each frequency band to obtain a useable signal, and if active satellites are being tracked, the transmitters on board the orbiting satellite must furnish a great amount of power to make each frequency sufficiently strong for detection at an earth station.

The amount of peak power required can be reduced by transmitting the various frequencies sequentially rather than simultaneously. However this introduces additional difficulties because, with the target moving, the phase differences obtained at the various frequencies are not referenced to a common target location. The resulting phase difference measurements cannot be combined directly to remove full wavelength ambiguities because each measurement refers to a slightly different target location. The phase errors introduced could be corrected by comparing the phases of two consecutive signals and generating a D.C. error signal proportional to the amount the target had moved during the time between the signals. This error signal could then be used to correct the phase difference signals. However, the conversion of the phase difference signals into D.C. signals for correction by a D.C. error signal is not optimum and it is preferable to correct signals while they are still in the A.C. form.

SUMMARY OF THE INVENTION

The present invention solves the problem of peak power requirement by transmitting plural frequencies sequentially rather than simultaneously and combining the received A.C. signals (or A.C. signals derived therefrom) in such a manner as to compensate for the time spacings of the transmitted frequencies and the movement of the object during these time spacings. The received signals are separated according to frequency and corresponding signals are recorded on a moving record medium such as a magnetic tape, drum, disk, etc. A.C. signals corresponding to the sequentially arriving frequency signals are recorded in the respective tracks with each signal displaced along its track by an amount depending upon the time when the signal is received. In order to read out these signals simultaneously, a first set of pick-up heads on the various tracks are displaced along the tracks by amounts which allow for the delays between the received frequencies. The delays between transmitted signals are not the only delays which must be corrected for because the motion of the target introduces further complications which must be taken into account. For example, in a system where a ground station sequentially transmits a plurality of different frequency signals and sequentially receives the target echoes resulting therefrom, the position of the target changes between each frequency transmission so that the echo signals may not be combined directly without obtaining an erroneous range measurement. Likewise, in a system for detecting an active target with its own transmitter on board, the sequentially transmitted frequencies could not be combined directly at the receiving station without allowing for the changes in the position of the target between the sequential signals.

The present invention compensates for this change of target location between signals by first recording signals corresponding to the received signals and then using two sets of pick-up heads for read out. One set of pick-up heads is located on the recording tracks so that one complete set of recorded signals is read simultaneously. A second set of pick-up heads is spaced further along the same recording tracks so that an earlier recorded set of signals are also read simultaneously. The pairs of signals for each frequency band are then added in a weighted fashion to produce resultant signals whose phases have been adjusted to compensate for the phase shift introduced by the change of position of the satellite.

An object of the present invention is the provision of a system for simultaneously combining sequentially received phase signals.

Another object is to provide a system for recording sequentially received signals and then simultaneously combining said recorded signals.

A further object of the invention is the provision of a system for recording sequentially received phase signals and simultaneously reading out said phase signals.

Still another object is to provide a system for recording sequentially received phase signals derived from signals from a satellite or other object and combining said recorded phase signals to obtain an indication of the location of said satellite or object.

Yet another object of the present invention is the provision of a system for adjusting the phases of sequentially received signals so that their phases correspond to that of simultaneously received signals.

A still further object of the invention is a system for weightedly combining a plurality of sequentially received signals so that the phase of the resultant signal is a linear function of the phases of the component signals.

BRIEF DESCRIPTION OF THE DRAWING

Other objects and many of the attendant advantages of this invention will be readily appreciated as the same becomes better understood by reference to the following detailed description when considered in connection with the accompanying drawing in which like reference numerals designate like parts throughout the figures thereof and wherein:

FIG. 5 shows a block diagram of a modified system according to the present invention.

DESCRIPTION OF THE PREFERRED EMBODIMENT

Figure 1:
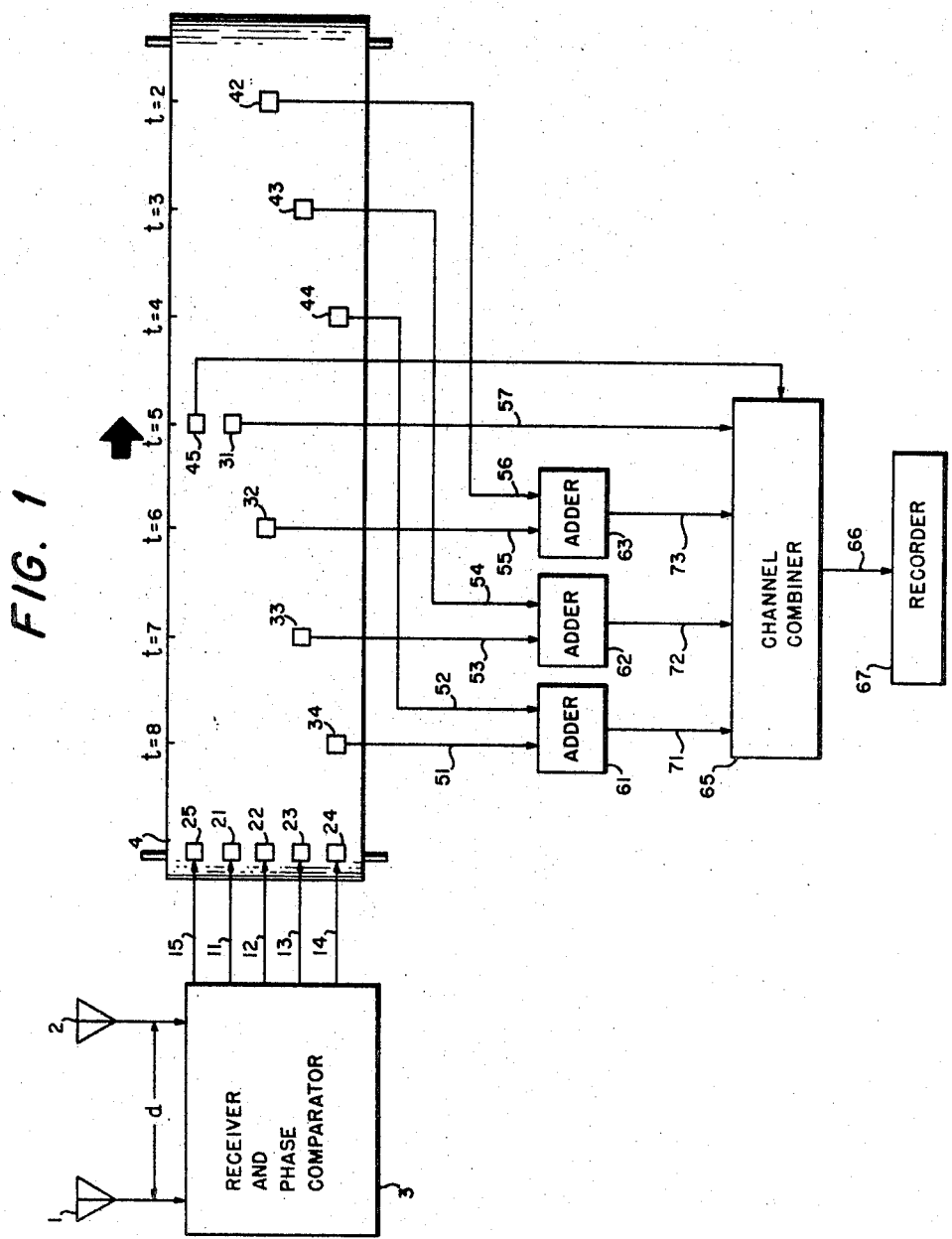
FIG. 1 shows a block diagram of a system according to the present invention.

FIG. 1 shows a block diagram of a system for receiving signals from a moving object. These signals comprise a sequence of different frequencies and may be signals generated on board the object or may be echoes arising from a sequence of signals transmitted from a sending station. Each signal is received by a pair of antennas 1 and 2 located a known distance $d$ apart. As explained in U.S. Pat. No. 3,249,943 issued to M. G. Kaufman on May 3, 1966, the electrical phase difference of the wave energy arriving at the antennas will depend upon the angle of arrival of the energy. Because of the great height of the target as compared with the baseline distance $d$ between the antennas, the rays arriving at the antennas are essentially parallel. It is clear that when the target is not on a plane equidistant between the antennas, the energy will reach one antenna later than it will reach the other antenna.

Figure 4:
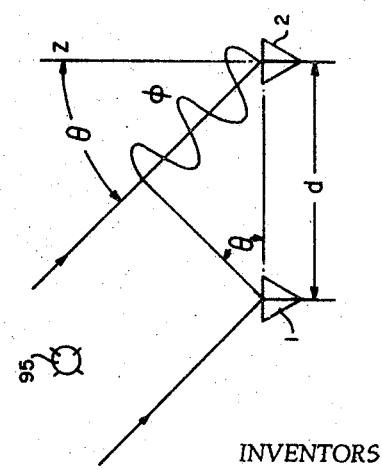
FIG. 4 illustrates the geometery of a satellite detecting situation.

FIG. 4 illustrates how this phase-front delay may be shown to be $$\varphi = d \sin \theta$$

where $\varphi$ = the electrical phase delay (wavelengths)
$d$ = the spacing between the antennas (wavelengths)
$\theta$ = the angle of arrival measured from zenith (space angle).

Figure 2:
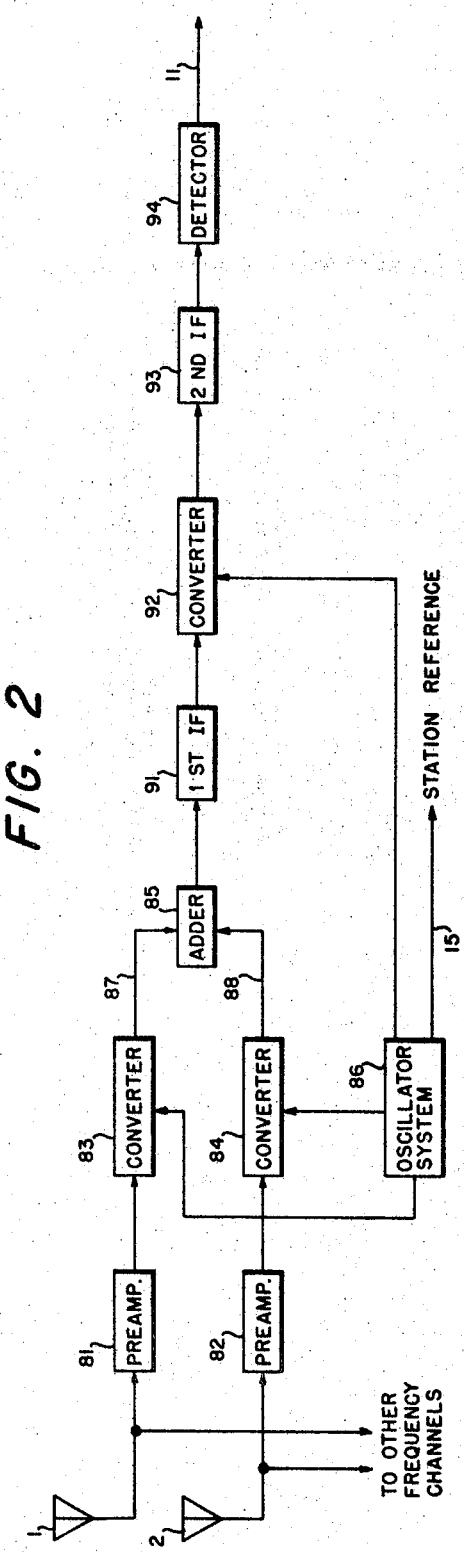
FIG. 2 shows a block diagram of a typical interferometer receiver and phase comparator for use in carrying out the invention.

Since $d$ is already known it is possible to determine $\theta$ by measuring the phase difference $\varphi$. This phase difference can be obtained by comparing the phases of the signals arriving at antennas 1 and 2 but, since phase measuring apparatus can measure only a difference in degrees that is an amount less than a whole wavelength, it is necessary to determine how many full wavelength are included in the phase delay. For example, if the measured phase difference is ¼ wavelength or 90°, the actual phase difference could be any combination of $360n° + 90°$, each indicative of a different direction angle of satellite 95 in FIG. 4. This ambiguity may be resolved by using a single antenna pair along with plural wavelengths. Such a system is illustrated in FIG. 1 where antennas 1 and 2 receive the various frequency signals $f_1$, $f_2$, $f_3$, and $f_4$, which are then separated into frequency channels. FIG. 2 shows a block diagram of a typical receiver and phase comparator circuit for one of the freqeuncy channels. The operation of this circuit has been fully explained in an article by M. G. Kaufman entitled "Post-Detection in the Navy Space Surveillance System," I.E.E.E. Transactions on Aerospace, vol. 2, No. 2, April 1964, pp. 151-159. It is sufficient here to point out that the system of FIG. 2 receives from antennas 1 and 2 singals having a given freqeuncy but differing in phase, and converts there signals into a single A.C. signal having a phase which corresponds to the phase difference of the two input signals.

Each of the sequential frequency signals received by antennas 1 and 2 are processed in a system similar to that shown in FIG. 2 and the resulting signals, including the phase information, appear on lines 11 through 14 to be recorded on magnetic tape 4. FIG. 1 shows four lines 11–14 corresponding to four frequency channels, but it should be clear that any number of frequencies could be used. It should also be clear that heads 25, 21, 34, 33, etc. could be adjustable in position to compensate for phase shifts in the system.

In one particular embodiment of the invention the signals on lines 11–14 each have a frequency of 1 kc., and a 1 kc. station reference signal appears on line 15. The various signals are recorded on tape 4 by means of recording heads 21–25. Since the various frequency signals are not received continuously but sequentially, read heads 31–34 are located along the tape so that the recorded signals arrive simultaneously under the respective read heads. If the satellite being detected were stationary in the sky, one set of read heads is all that would be necessary to read the signals for further processing. However, if the satellite is moving, it is necessary to allow for the change in satellite location during a sequence of signals. For example, suppose four frequencies $f_1$, $f_2$, $f_3$, and $f_4$ are received sequentially at antennas 1, 2. The $f_1$ signal is received by the antennas and converted into a 1 kc. signal having a phase which depends upon the phase difference between the $f_1$ signals received at the two antennas. This 1 kc. signal is recorded by head 21. Likewise, the sequentially following $f_2$, $f_3$ and $f_4$ signals are received by antennas 1, 2 and converted into individual 1 kc. signals for recording by heads 22–24. Since the four resulting 1 kc. signals were obtained at four different satellite locations, they cannot be combined directly to obtain a correct satellite bearing measurement. A scheme for compensating for this change in satellite location is shown in FIG. 1. Suppose the signals have been recorded on tape 4, at times $t = 2, 3, 4, 5, 6, 7$, and 8 as indicated along the top of tape 4 in FIG. 1. At time $t = 9$ these stored signals will arrive at read heads 42, 43, 44, 31, 32, 33, and 34 respectively. The signals being read by heads 32 and 42 at time $t = 9$ represent successive signals derived from frequency $f_2$ and recorded at times $t = 2$ and $t = 6$. By properly weighting these two 1 kc. signals in adder 63, it is possible to obtain a 1 kc. signal whose phase corresponds to the phase of an $f_2$ signal received at some intermediate time, say $t = 5$. Thus, even though a signal of frequency $f_2$ was not received at time $t = 5$, it is possible to derive a signal on line 73 which has a phase corresponding to such a signal. Likewise, the two signals at heads 43 and 33, representing successive signals derived from frequency $f_3$ at times $t=3$ and $t=7$ may be added in adder 62 to obtain on line 72 a 1 kc. signal whose phase corresponds to the phase of an $f_3$ signal which would have been received at time $t=5$. Similarly a 1 kc. signal on line 71 may be obtained which represents the phase of an $f_4$ signal received at time $t=5$. In this way it can be seen that the phase signals on lines 57, 73, 72 and 71 correspond to $f_1$, $f_2$, $f_3$, and $f_4$ signals as if these latter signals were all received simultaneously at time $t=5$.

These simultaneous signals may be combined in channel combiner 65 to produce a single signal whose amplitude corresponds to the angle of the target being detected. This angle signal is then recorded on recorder 67. Channel combiner 65 may be constructed in various fashions. Two possible examples are shown in U.S. Pat. No. 3,217,326 issued Nov. 9, 1965 to M. G. Kaufman and D. W. Lynch, and in U.S. Pat. No. 3,249,943 issued May 3, 1966 to M. G. Kaufman.

Figure 3:
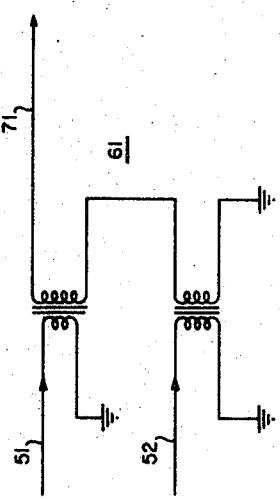
FIG. 3 shows a simple circuit for adding a pair of A.C. signals in a weighted fashion.

FIG. 3 illustrates one possible way of implementing an adding circuit such as adder 61. The two 1 kc. signals are applied on lines 51 and 52 and a resultant 1 kc. signal is taken out on line 71. The turns ratios of the transformers may be chosen so that the phase of the resultant signal may be at any desired value between the phases of the input signals. The turns ratios may be adjustable if desired.

The embodiment shown in FIG. 1 illustrates a system wherein the incoming pairs of signals received at antennas 1 and 2 are first combined in receiver and phase comparator 3 to produce A.C. signals containing the phase difference information. These A.C. signals are then recorded and read out in order to obtain the proper phase compensation. It is also possible to record the signals before they are processed in the phase comparator. The phase adjustment for error introduced by the change of location of the target is then made before the signals are supplied to the phase comparator. FIG. 5 illustrates such an embodiment. The sequential signals are received by antennas 501 and 502 and distributed according to frequency to recording heads 521a–524b. The signals received at antenna 501 are recorded by heads 521a, 522a, 523a, and 524a while the signals received at antenna 502 are recorded by heads 521b, 522b, 523b, and 524b. Of course the R.F. signals may be reduced in frequency before the recording takes place as long as the phase information is retained. For example, if four frequencies $f_1$, $f_2$, $f_3$ and $f_4$ are received in sequence, $f_1$ (or a lower frequency derived therefrom) is channeled to lines 511a and 511b, $f_2$ to lines 512a and 512b, $f_3$ to lines 513a and 513b, and $f_4$ to lines 514a and 514b.

In a manner similar to that discussed for FIG. 1 above, two consecutive recordings of the same frequency signal are read out and added to produce a signal having the same frequency but differing in phase from the two added signals. Just as in FIG. 1, the system of FIG. 5 operates to receive sequential signals from a target which is changing location and to convert these signals into simultaneous signals whose phases correspond to those of signals from a target which has not changed position. Thus, if signals have been recorded on tape 504 at times $t=2, 3, 4, 5, 6, 7$, and 8 as indicated along the top of tape 504, these signals will arrive at read heads 542a, 542b, 543a, 543b, 544a, 544b, 531a, 531b, 532a, 532b, 533, 533b, 534a and 534b at time $t=9$ to be processed through adders 561b–563a. The resulting signals on lines 571b, 571a, 572b, 572a, 573b, 573a, 574b, and 574a correspond in phase to signals which could have been obtained simultaneously from the target at time $t=5$. These phase adjusted signals may then be applied to phase comparators 581–584 to obtain phase difference signals for application to channel combiner 565. The phase comparators could each be similar to the system shown in FIG. 2 described above. Converters 83 and 84 could be placed before or after the recording/read out operation. For example, preamplifiers 81, 82 and converters 83, 84 could be included in receiver block 503 in FIG. 5 and the signals on lines 87 and 88 (of FIG. 2) could be applied to the recording heads 521a and 521b, respectively. The other pairs of recording heads would receive similar pairs of signals. The signals on lines 591, 592, 593 and 594 would be A.C. signals containing phase information ready for application to channel combiner 565. This channel combiner could be the same as channel combiner 65 of FIG. 1 if desired.

Obviously many modifications and variations of the present invention are possible in the light of the above teachings. It is therefore to be understood that within the scope of the appended claims, the invention may be practiced otherwise than as specifically described. The temporary storage of A.C. signals containing phase information could be carried out in various ways. For example, with relatively closely spaced signals the moving storage medium could be replaced by a sonic (liquid, solid, etc.) delay line or the signals may be stored in resonant circuits or chambers which would retain the phase information.

A more symmetrical processing arrangement could be obtained by transmitting the frequencies in one order and then reversing this order (for example, $f_4$, $f_3$, $f_2$, $f_1$, $f_2$, $f_3$, $f_4$) so that pairs of equal frequency signals would be symmetrically spaced in time about a center reference time.

Plural phase measurements may also be used to determine distance as well as angle and in such cases the present invention may be used to store sequential signals and compensate for phase changes due to the lack of simultaneity of the signals.

The system has been disclosed for use with electromagnetic radiation but it could be used with other types of energy such as in sonar systems. The antennas could be sonic transducers and the system could correct for target motion as well as motion of the searching ship.

What is claimed and desired to be secured by Letters Patent of the United States is:

1. In a radio interferometer system for determining the direction of a moving target by phase comparison of a predetermined, timed, sequence of a plurality of different frequency signals which are received from the moving target; a direction adjustment system which compensates for the movement of said target during the sequence of said plurality of different frequency signals comprising:
   first and second antennas separated by a known distance $d$ for intercepting said sequence of different frequency signals received from said target;
   receiver means connected to said first and second antennas for providing a plurality of output signals on a plurality of output leads, each of said leads containing electric signals relating to only one frequency of said plurality of different frequencies;
   a plurality of recording heads connected individually to said plurality of receiver means output leads;
   moving storage means moving at a predetermined speed for storing signals recorded therein by said plurality of recording heads;
   first and second read out means for reading out signals stored on said moving storage means, said first read out means including a plurality of read out heads so located relative to said moving storage means as to be in a position to simultaneously read out all stored signals relating to a preceding sequence of said plurality of different frequency signals and said second read out means including a plurality of read out heads so located relative to said moving storage means as to be in a position to simultaneously read out all stored signals relating to the sequence of signals following the preceding sequence of signals read out by said first read out means and
   a plurality of adder means, each adder means being connected to the read out head of said first read out means and to the read out head of said second read out means which read out the stored signals relating to a particular frequency of said plurality of different frequency signals, each of said plurality of adder means functioning to add the signals from said preceding sequence and from said following sequence in a weighted manner calculated to have said plurality of adder means produce output signals which are so compensated that all such output signals relate to a particular position of said moving target.

2. The direction adjustment system of claim 1 wherein said receiver means provides output signals having the same frequency and each output signal is of a phase which is related to the phase difference of the signals concurrently intercepted by said first and second antennas.

3. The direction adjustment system of claim 2 wherein said moving storage means is a magnetic tape having a plurality of channels which continuously move in cooperative relationship with said plurality of recording heads, said plurality of read out heads in said first read out means and said plurality of read out heads in said second read out means.

4. The direction adjustment system of claim 3 wherein each of the output signals of said plurality of adder means indicates the direction of said moving target according to the formula $\phi = d \sin \theta$ where $\phi$ is the phase of said adder output signal, $d$ is the distance between said first and second antennas expressed in wavelengths of the particular frequency signals associated with a particular adder means and $\theta$ is the direction to said moving target.

5. The direction adjustment system of claim 1 wherein said receiver means provides a plurality of output signals, half of which are related to signals intercepted by said first antenna and the other half of which are related to signals intercepted by said second antenna.

6. The direction adjustment system of claim 5 wherein said moving storage means is a magnetic tape having a plurality of channels which continuously move in cooperative relationship with said plurality of recording heads, said plurality of read out heads in said first read out means and said plurality of read out heads in said second read out means.

7. The direction adjustment system of claim 6 and further including a plurality of phase comparison means connected to said plurality of adder means for comparing the phase of signals intercepted by said first antenna and the phase of signals intercepted by said second antenna and for producing output signals which indicate the direction of said moving target according to the formula $\phi = d \sin \theta$ where $\phi$ is the phase difference of said phase comparison means input signals, $d$ is the distance between said first and second antennas expressed in wavelengths of the particular frequency signals associated with a particular phase comparison means and $\theta$ is the direction to said moving target.

References Cited

UNITED STATES PATENTS

| 3,217,287 | 11/1965 | Knox | 179—100.2 |
| 2,907,008 | 9/1959 | Krieger | 179—100.2 |
| 2,843,676 | 7/1958 | Halliday | 179—100.2 |
| 2,629,784 | 2/1953 | Daniels | 179—100.2 |
| 2,497,654 | 2/1950 | Begun | 179—100.2 |

J. RUSSELL GOUDEAU, Primary Examiner

U.S. Cl. X.R.

179—100.2